United States Patent Office 3,200,699
Patented Aug. 17, 1965

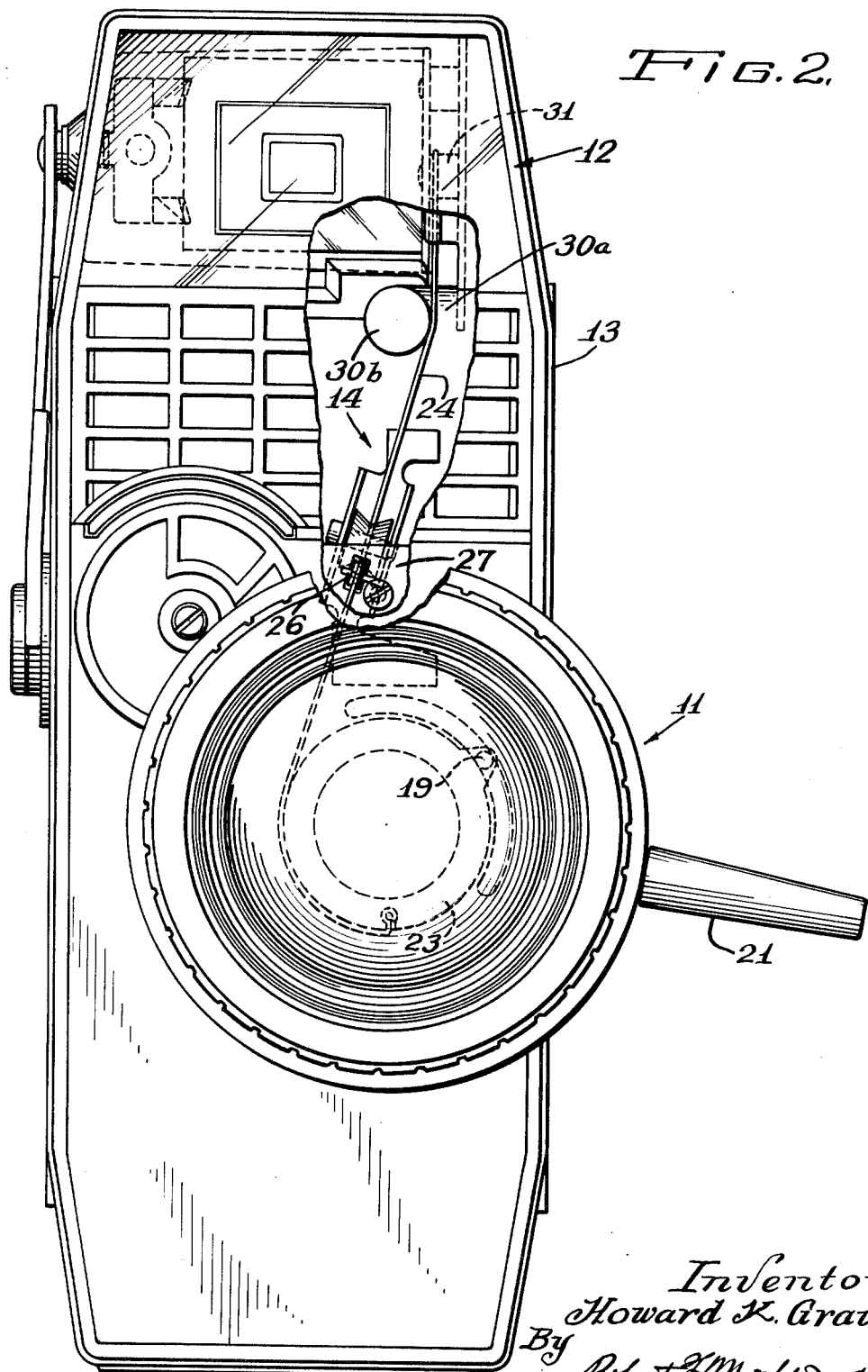

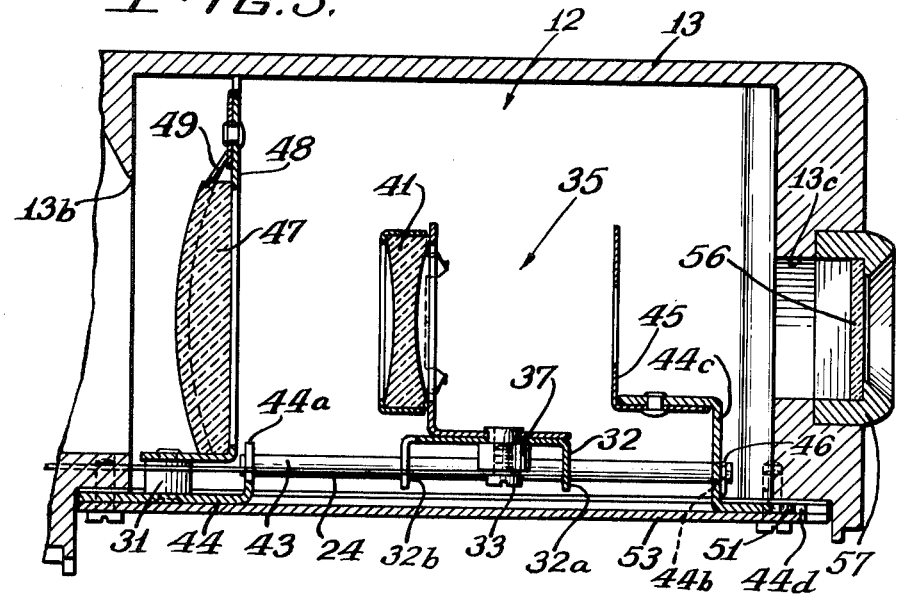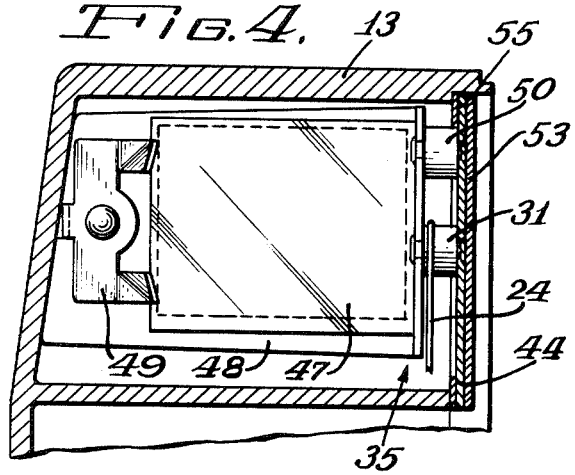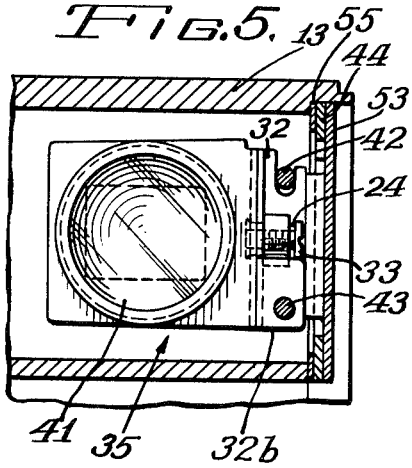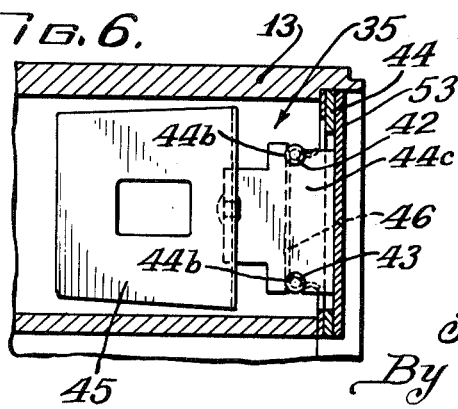

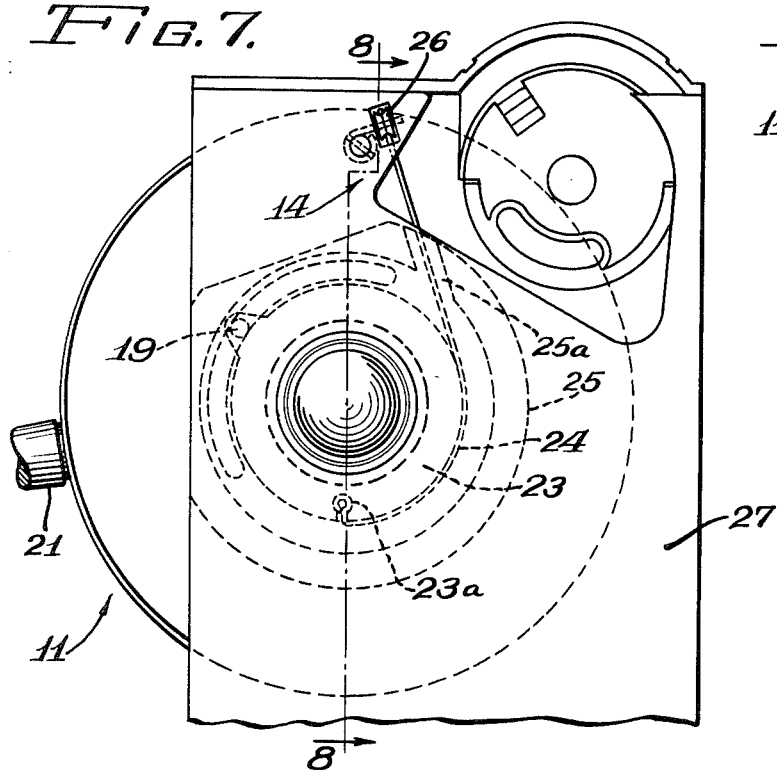
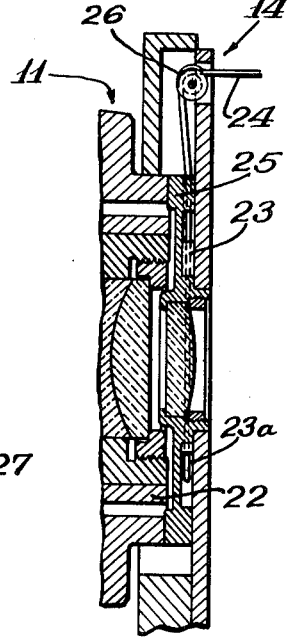
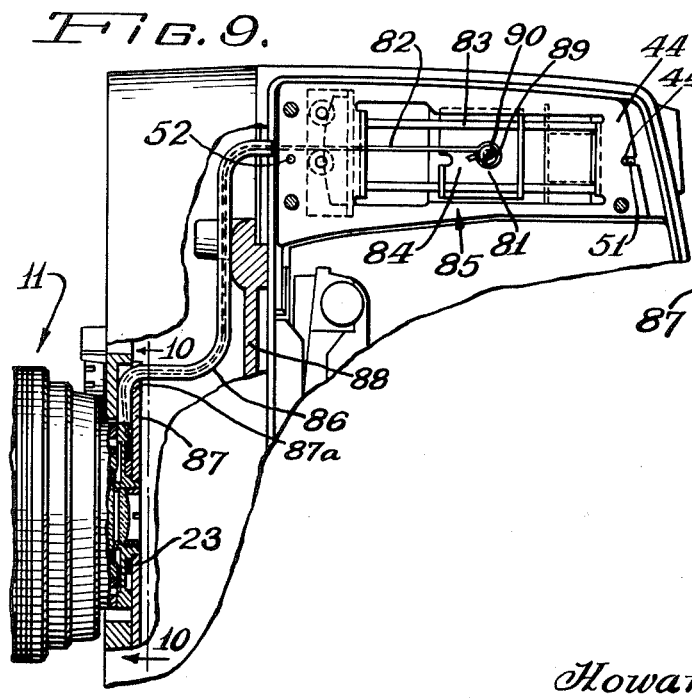
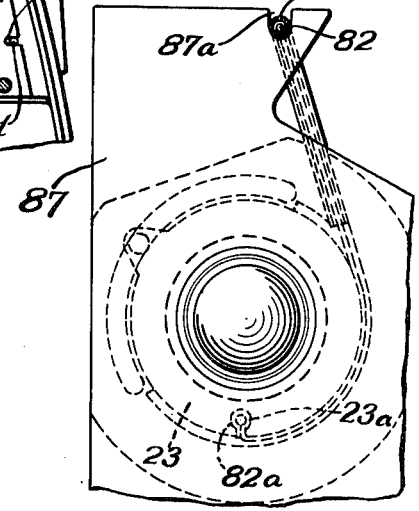
Inventor:
Howard K. Graves
By Robert H. Michler, Atty.

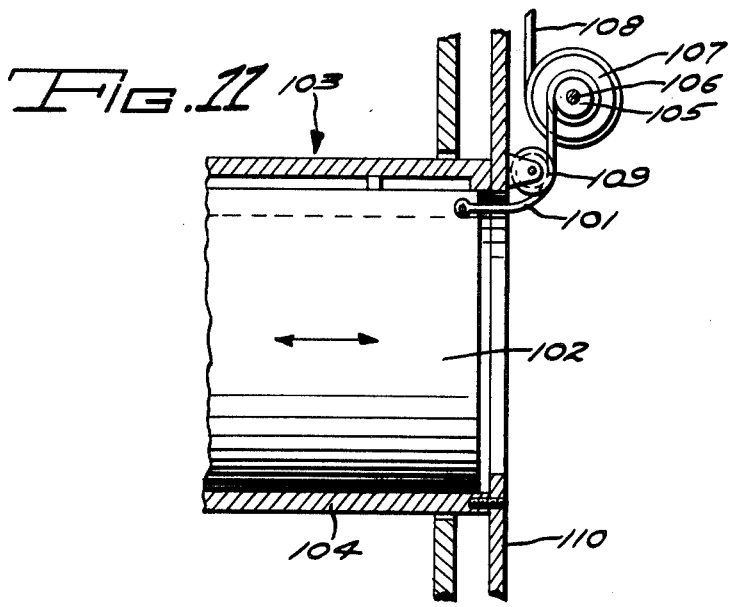
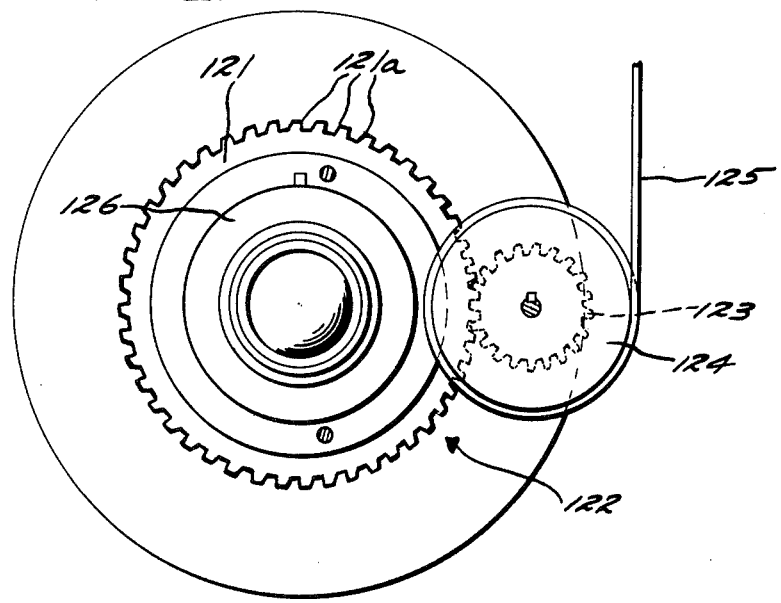

3,200,699
CAMERA ZOOM OBJECTIVE AND ZOOM VIEW-
FINDER WITH FLEXIBLE CABLE COUPLING
Howard K. Graves, Morton Grove, Ill., assignor to Bell &
Howell Company, Chicago, Ill., a corporation of
Illinois
Filed Nov. 23, 1959, Ser. No. 854,640
1 Claim. (Cl. 88—1.5)

This invention relates to a zoom lens system, and more particularly to a coupling between a zoom objective and a zoom viewfinder.

An object of the invention is to provide a zoom viewfinder synchronized with a zoom objective.

Another object of the invention is to provide a camera in which a zooming component of a viewfinder is moved by a flexible coupling member operated by a movable member of a zoom objective of the camera.

Another object of the invention is to provide a viewfinder subassembly including a base on which a field lens is secured in a stationary position and along which a zooming lens is slidable by means coupling the zooming lens to a zoom objective of the camera.

A complete understanding of the invention may be obtained from the following detailed description of zoom lens systems forming specific embodiments thereof, when read in conjunction with the appended drawings, in which:

FIG. 2 is a front elevation view of the camera of FIG. 1 with portions thereof broken away;

FIG. 3 is an enlarged horizontal sectional view taken along line 3—3 of FIG. 1;

Figure 1:
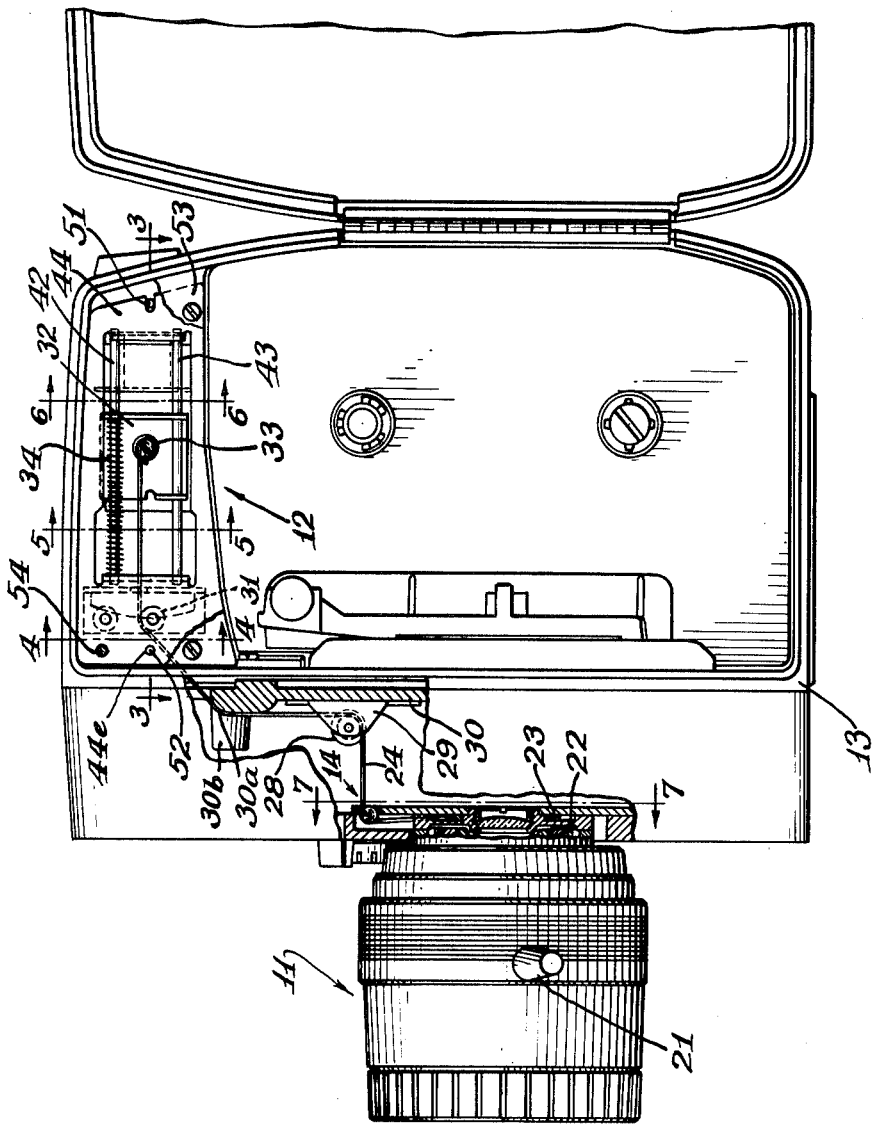
FIG. 1 is a fragmentary, partially sectional, partially elevational view of a camera having a zoom lens system forming one embodiment of the invention.

FIGS. 4, 5 and 6 are enlarged vertical sectional views taken respectively along lines 4—4, 5—5 and 6—6 of FIG. 1;

FIG. 7 is an enlarged elevation view taken along line 7—7 of FIG. 1;

FIG. 8 is an enlarged vertical sectional view taken along line 8—8 of FIG. 7;

FIG. 9 is a fragmentary, side elevation view of a camera including a zoom lens system forming an alternate embodiment of the invention;

FIG. 10 is a vertical sectional view taken along line 10—10 of FIG. 9;

FIG. 11 is a fragmentary, vertical sectional view of a camera including a zoom lens system forming a further embodiment of the invention; and FIG. 12 is a fragmentary elevation view of a portion of the interior of a camera forming another embodiment of the invention.

The invention provides a camera including a zoom lens system having a zoom objective and a zoom viewfinder together with coupling means zooming the viewfinder as the objective is zoomed. The viewfinder includes a zooming lens member movable along its optical axis and a flexible coupling member extends from the lens member to a rotatable zooming element of the zoom objective to move the viewfinder lens member in accordance with the rotation of the zooming element of the objective. Preferably the zooming lens member of the viewfinder is mounted slidably on a base of a subassembly also carrying a field lens of the viewfinder and the objective has a capstan for winding thereon and unwinding therefrom either a spring push wire or a flexible cable to move the zooming lens member along the base.

Referring now in detail to the drawings, there is shown in FIG. 1 a camera having a zoom main objective 11, a zoom viewfinder 12 mounted at the top of the camera housing 13 and a coupling mechanism 14 for zooming the viewfinder in synchronism with the zooming of the main objective and by zooming operation of the main objective of the camera. The lens mounting structure of the main objective is disclosed in detail and claimed in co-pending application Serial No. 854,732, filed November 23, 1959, now Patent No. 3,059,533 by Frank W. Mellberg and assigned to the assignee of the instant application.

When a handle 21 of the objective 11 is turned manually, the magnification of the objective is varied and zooming sleeve 22 of the objective turns a capstan 23 to, depending on the direction of turning, either wind a flexible cable 24 on the capstan or unwind the cable from the capstan. The capstan has a pin 19 which is splined to the sleeve 22. Knotted end of the cable is locked in undercut slot 23a of the capstan. The cable extends from the capstan. The capstan has a pin 19 which is splined to the sleeve 25, over a grooved roller 26 mounted on fixed plate or wall 27 of the camera, under grooved roller 28 (FIGS. 1 and 2) mounted by bracket 29 on inner wall 30 of the camera, over rounded surface 30a and partially around guide post 30b, and over spacing stud 31 to a carriage 32 of a viewfinder subassembly 35. The end of the carrier 32 is secured to the carriage by the head of a screw 33 threaded into a tapped stud 37 riveted to the carriage. The carriage is urged by a compression spring 34 to the right, as viewed in FIG. 1, so far as the cable 24 will permit. Thus, by turning the objective 11 by means of the handle 11, the carriage 32 will be either pulled to the left by the cable 24 or pushed to the right by the spring 34, depending, of course, on the direction the handle is revolved.

The carriage 32 carries a negative zooming lens 41 (FIG. 3) and comprises a plate-like member having downwardly turned end flanges 32a and 32b slidable on rods 42 and 43 (FIGS. 4 and 5). The rods are riveted to tab portion 44a (FIG. 3) of base plate 44 and extend parallel to the optical axis of the viewfinder and project through notches 44b in bracket portion 44c, which mounts a framing mask or diaphragm 45 riveted thereto. A wire spring retaining clip 46 fits into grooves in the ends of the rods to hold the rods tightly in the notches 44b (FIG. 6). The plate 44 forms the base of a subassembly including the mask 45, the zooming lens 41 and a field lens 47 (FIG. 3) secured to a bracket 48 by a spring retainer 49. The retainer is mounted on spacer studs 31 and 50 riveted to the plate 44. The plate has a locating slot 44d co-operating with a pin 51 on the housing 13, and also has a locating hole 44e (FIG. 1) fitting over pin 52 fixed to the housing. The plate 44 and a cover plate 53 are secured to the housing 13 by screws 54, and a felt gasket 55 (FIG. 4) acts as a light seal. The housing 13 has an entrance opening 13b (FIG. 3) for the viewfinder, and an eye-piece 56 is mounted in opening 13c in the housing by mount 57.

When the handle 21 (FIG. 1) is turned to change the magnification of the objective 11, either the cable 24 or the spring 34 moves the carriage 32 to produce a corresponding change in magnification in the viewfinder. In the embodiment described above, the capstan 23 (FIG. 7) is concentric with its axis of rotation so that linear movement of the lens 41 is obtained. However, the capstan may be provided with a cam-shaped periphery for a viewfinder requiring a non-linear movement for zooming.

The camera shown in FIGS. 9 and 10 forms an alternate embodiment of the invention, and is substantially identical with the camera shown in FIGS. 1 to 8 except as described below. The camera of FIGS. 9 and 10 couples the main objective 11 thereof to a viewfinder zooming carriage 81 by means of a flexible wire rod 82. The carriage 81 is mounted on rods 83 and 84 of a viewfinder subassembly 85 which is identical with the subassembly 35 except that the subassembly 85 does not have a spring corresponding to the spring 34 (FIG. 1), the wire rod 82 (FIGS. 9 and 10) being sufficiently stiff to push the carriage 81 as well as pull the carriage. A generally S-shaped, stiffening guide tube 86 guides the rod 82 between the vewfinder and the capstan 23, and is supported in a notch 87a in mounting plate 87 and may be also fastened to mounting plate 88. End 82a of the rod 82 looped back on itself and fastened in undercut slot 23a of the capstan 23 to secure the rod to the capstan. The other end of the rod is secured to the carriage 81 by screw 89 and stud 90 riveted to the carriage.

In the embodiment of the invention shown in FIG. 11, there is shown a flexible coupling element or cord 101 secured at one end to a zooming sleeve 102 of a zoom lens 103. The sleeve 102 is longitudinally moved in a fixed mounting sleeve 104 during zooming to move the zooming lens element (not shown) to vary magnification. The other end of the coupling element 101 is wrapped around and secured to capstan 105 rotatably mounted by shaft 106 and keyed to capstan 107. A flexible element 108 is connected to a spring-pressed viewfinder zooming lens element (not shown). The cord 101 travels around guide roller 109 mounted on wall 110. The diameter of capstan 107 is greater than that of capstan 105 to multiply the movement of the viewfinder zooming lens over that of the zooming lens of the objective where such multiplied movement is necessary for synchronization of the two zooming lenses.

In the embodiment of the invention of FIG. 12, rotatable sleeve 121 of zoom objective 122 mounted on the camera has gearing 121 thereon to rotate gear 123 keyed to capstan 124. The capstan 124 actuates flexible element 125 secured to the zooming lens of the viewfinder to synchronize its movement with that of the zooming lens of the zoom objective, which latter lens is carried by axially movable zooming sleeve 126. The sleeve 126 is moved axially by rotation of the sleeve 121.

While the invention is thus described, it is not wished to be limited to the precise details described, as changes may be readily made without departing from the spirit of the invention.

What is claimed is:
In a zoom camera,
a housing including a front wall,
a zoom objective mounted on said front wall and projecting forwardly therefrom,
a viewfinder chamber in said housing positioned rearwardly of said front wall,
a manually rotatable zooming sleeve surrounding said zoom objective and cooperable therewith to zoom said zoom objective,
a capstan mounted for rotation about the axis of said zooming sleeve,
a pin on said capstan splined to said zooming sleeve to turn the capstan as the zooming sleeve is rotated,
a plurality of guide rods in said viewfinder chamber,
a viewfinder carriage mounted for reciprocating movement on said rods,
a viewfinder zooming lens means mounted on said carriage for movement along the viewfinder chamber in a direction substantially parallel to the axis of said zoom objective and axially spaced therefrom,
a flexible cable fixedly attached at one end to said capstan and at its other end to said viewfinder carriage for converting rotary movement of said capstan to a linear driving action on said viewfinder carriage,
a spring mounted in said viewfinder chamber for biasing said viewfinder carriage to maintain said flexible cable taut and permit said cable to transmit movement when said capstan is rotated in either direction,
a plurality of curved and grooved guide members engaging said cable between said capstan and said viewfinder carriage to guide said cable in an offset path and to transmit vertical motion imparted to it by the capstan into horizontal motion of the viewfinder carriage.

References Cited by the Examiner

UNITED STATES PATENTS

| | | | |
|---|---|---|---|
| 2,135,963 | 11/38 | Crumrine | 88—1.5 |
| 2,342,876 | 2/44 | McWilliams | 95—44 |
| 2,552,244 | 5/51 | White | 95—44 |
| 2,640,777 | 6/53 | Fachman | 95—44 |
| 2,737,082 | 3/56 | Dowling. | |
| 2,755,701 | 7/56 | Altman | 88—1.5 |
| 2,900,869 | 8/59 | Bjelland et al. | 95—44 |
| 2,945,415 | 7/60 | Bechtold et al. | 88—1.5 |
| 2,995,061 | 8/61 | Briskin et al. | 88—16 |

FOREIGN PATENTS

| | | |
|---|---|---|
| 890,428 | 11/43 | France. |
| 599,981 | 7/34 | Germany. |
| 668,673 | 3/52 | Great Britain. |
| 692,388 | 6/53 | Great Britain. |

DAVID H. RUBIN, *Primary Examiner.*

DELBERT B. LOWE, EMIL G. ANDERSON,
*Examiners.*